United States Patent Office 3,803,329
Patented Apr. 9, 1974

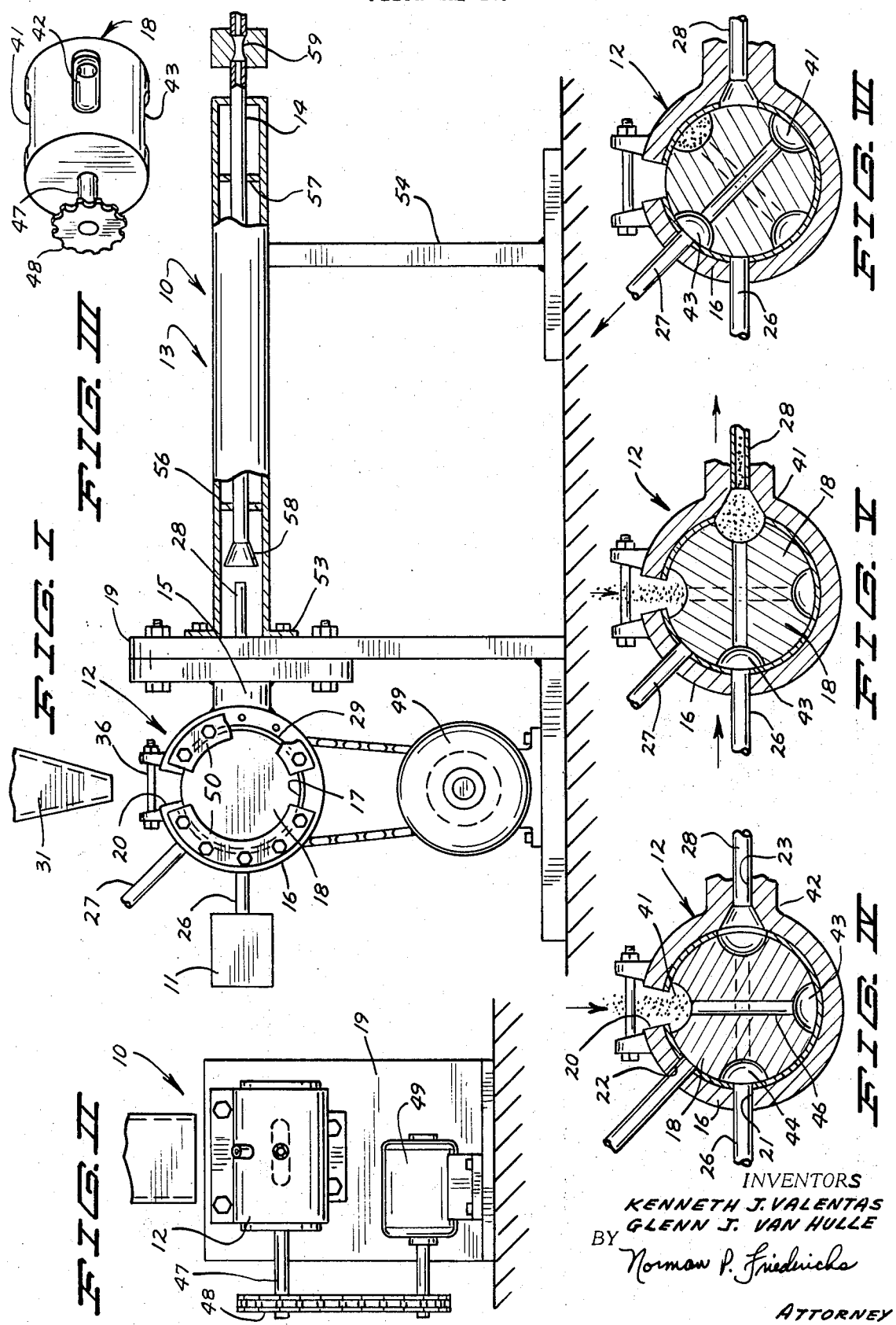

3,803,329
**METHOD FOR PRODUCING A BLAND,
TEXTURED SOY PROTEIN**
Kenneth J. Valentas, Golden Valley, and Glenn J. Van
Hulle, New Hope, Minn., assignors to General Mills,
Inc.
Filed May 10, 1971, Ser. No. 141,565
Int. Cl. A23j 3/00; A23l 1/20
U.S. Cl. 426—44                                    8 Claims

ABSTRACT OF THE DISCLOSURE

A method is disclosed for producing a bland textured protein product. The method includes the steps of fermenting moistened vegetable protein material. The fermented material then is treated in a flowing stream of hot, pressurized vapor such as steam.

The present invention relates to a method for treating food products and more particularly to a method for producing a bland textured protein.

In recent years substantial effort has been directed toward treating vegetable protein materials so as to provide such materials with texture and other characteristics commonly found in animal meat products. The vegetable protein materials are primarily soybean meal and flour; however, various other oil seed meals and flours are also used, such as peanut, cottonseed and sesame seed meals and flours.

In the past much effort has been made to reduce the characteristic "sweet" or "beany" flavor of the vegetable protein material. In some instances the protein is extracted from the flour or meal through solubilizing the protein and then precipitating the protein concentrate or isolate. Such processing is effective in reducing the sweet or beany flavor; however, such processing is expensive. It has also been recognized that fermentation will reduce the adverse flavor characteristics. Fermentation may be carried out by soaking the soybean material in water thereby forming a slurry. The natural enzymes in the soybean material will produce a certain amount of fermentation. Active yeast may be added to the slurry to improve the rate and amount of fermentation. Although fermentation in a slurry does improve the flavor of the soy material, certain problems are inherent in such processing, foremost of which is the fact that the slurry must be dried prior to use in texturization processes. In the present invention it was surprisingly discovered that soy material may be fermented at a low moisture level, such as 20 to 35%. The soy material, at these moisture levels, is essentially granular or particulate and is not a dough or slurry. The present invention provides a method in which soy material or other vegetable protein material is treated to reduce the soy flavor to a level acceptable even in bland food products. The level of stachyose and raffinose (recognized for producing flatulence) is substantially reduced and fermentation products, such as alcohols, are removed. It is believed that the flavor modification takes place through enzyme action on the oligosaccharides to produce simple sugars followed by yeast action on the simple sugars to produce alcohols and carbon dioxide. The alcohols and any carbon dioxide present are removed during texturization.

The present invention provides a method in which soy material or other vegetable protein material having a moisture content of from 20 to 35% by weight is fermented in the presence of yeast or other fermentation microorganism. Such materials include flour, meal and concentrates or in other words nonisolated vegetable protein materials. Isolated vegetable protein materials may also be processed, however, since the protein has been previously removed from the oligosaccharides, improvement may not be noted. The fermented protein material is treated in a stream of hot pressurized steam. The combined steps of fermentation and treatment in the hot pressurized steam modify the flavor in a manner not found in material treated by either process step alone. Moreover, the resulting product is texturized. The product is considered to be texturized when the protein fraction is present in a substantially continuous phase and the carbohydrate fraction is in discrete portions; whereas, untextured protein material contains protein in discrete portions and the carbohydrate fraction is in a continuous phase. The term "texturizing" as used herein will refer to the process of changing the discrete portions or particles of protein into continuous phase protein.

The vegetable protein material to be processed according to the present invention may be of the same types of flours, meals and concentrates previously used in texturizing processes such as soybean, peanut, cottonseed, safflower and sesame seed flours, meals and concentrates. However, the present invention will be described with respect to soy flour.

The soy flour in the present invention is wetted to between 20 and 35% moisture, by weight, using any suitable method which assures uniform distribution of the moisture. One such method for adjusting moisture content is by spraying water under high pressure into soy flour which is being agitated in a conventional mixer such as a cake finisher. A preferred method for adding the yeast and/or enzyme material is by dispersing such material in the water that is being added to the soy flour. Alternatively, the yeast and/or enzyme material may be added directly to the soy flour either before or after addition of the water. The yeast, when used, is present in an amount of at least 0.5%, preferably 0.5 to 2.5%, by weight, based on the weight of the moistened flour. The enzyme, when added, is present in an amount of at least 0.3%, preferably 0.3 to 1.5%, generally about 1.0%. The moistened soy flour is next incubated at a temperature sufficient to permit fermentation at a reasonable rate. The incubation must be at a temperature of at least 40° F., preferably 75 to 125° F., generally about 100° F. The incubation period should be long enough to effect improved blandness. Typically the incubation period will be about 24 to 48 hours; however, longer periods are generally not detrimental although they may not further improve the blandness over shorter fermentation periods. The yeast may be any type that will produce fermentation in soy flour or produce enzymes that break down carbohydrates especially oligosaccharides such as raffinose and stachyose in the soy flour. Representative yeasts include Saccharomyces such as *Saccharomyces carlsbergensis*, *Saccharomyces cerevisiae* and *Saccharomyces ellipsoideus*, as well as, various commercially available yeast products such as Fleischmann's® bakers cake yeast, Red Star Instant Blend Dried Yeast®, and Monk's® dried yeast. Any enzyme, such as zymase, may be used that will break down the oligosaccharides into simple sugars. Representative enzymes include alpha-D-galactoside galactohydrolase (Enzyme Commission No. I.U.P.A.C.3.2.1.22), as well as, commercially available enzymes, typically crude malting enzymes and Diastase 80®.

The fermented material is treated in the presence of steam at an elevated gaseous pressure and an elevated temperature. The moisture content of the fermented material is preferably between 15 and 35% by weight at the time of steam treatment; however, the moisture content may be as low as 4 or 6%.

The maximum pressure used in the steam treatment is limited only by the particular apparatus used. For example, pressures as high as 140 p.s.i.g. and as low as 15 p.s.i.g. may be used. The preferred pressure conditions of the present invention are at least 25 p.s.i.g., generally at least 55 p.s.i.g., typically 80 to 110 p.s.i.g. It has been found that an increase in pressure generally results in an increase in blandness, texturization and/or expansion. The temperature during steam treatment will generally be at least 250° F. and may be as high as 500° F. or higher. Any type of apparatus capable of providing such conditions may be used in carrying out the present invention. Preferred apparatus for carrying out the steam treatment step of the present invention is shown in FIGS. I–VI.

In the drawings:

FIG. I shows a side view of the apparatus with portions broken away.

FIG. II shows an end view of the apparatus.

FIG. III shows a portion of a valve of the apparatus.

FIGS. IV–VI show cross sectional views of the valve in various positions of operation.

The texturizing apparatus 10 (FIG. I) may include a rotary valve 12, a pressure tank 13 and a tube 14. The texturizing apparatus 10 is connected to a high pressure fluid source 11 such as a steam boiler which should be capable of providing a fluid or steam pressure to the rotary valve 12 sufficient to texturize the protein material.

The rotary valve 12 may include a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet for material to be texturized. The housing 16 (FIG. IV) further includes openings 21, 22 and 23 for reception of pipes 26, 27 and 28, respectively. The pipes, for example, may be threadedly engaged in said openings. The pipe 26 is connected to the steam source 11 and feeds the pressurized steam to the valve 12. Pipe 27 is an exhaust pipe which depressurizes any residual steam pressure in valve 12 prior to feeding of protein material to the valve 12 through opening 20. Pipe 28 is the outlet through which protein material leaves valve 12. A hopper 31 (FIG. I) may be provided for feeding protein material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18 thereby providing a steam seal between bearing 29 and the rotary valve member 18. The bearing 29 may be constructed from a brass cylinder.

The rotary valve member 18 (FIGS. II–VI) may be of steel and may be constructed from a solid cylinder or alternatively it may be formed by casting. The member 18 is provided with any desired number of material conveying pockets such as 41, 42, 43 and 44. The member 18 will normally have an even number of such pockets, typically four, six or eight. Passageway 46 is provided between each pair of pockets such as pockets 41 and 43, for purposes hereinafter described. The rotary valve member 18 has a shaft 47 and a sprocket 48 for driven engagement with suitable power means such as motor 49 (FIG. I). The valve member 18 may be held in position in housing 16 by restraining plates, such as plates 50 which are secured to housing 16 by screws.

The pressure tank or surge tank 13 and the tube 14 in the embodiment shown in FIG. I may be concentric pipes. The pressure tank 13 may be secured to the support bracket 19 by flange 53. The pressure tank 13 may be further supported by one or more leges such as leg 54. The pressure tank 13 is sealed from the atmosphere except through tube 14. The tube 14 is mounted in pressure tank 13 such as by spider flanges 56 and 57. If desired, a portion 58 of tube 14 nearest to valve 12 may be flared radially outwardly for ready reception of the protein material from pipe 28. Space is provided between the outermost edge of flared portion 58 and the adjacent wall of pressure tank 13 so that the pressure may equalize throughout tank 13.

The tube 14 may have a restricted orifice or nozzle 59 which limits the escape of pressure from the texturizing apparatus 10 thereby providing a build up of pressure in tank 13. Alternatively the diameter of the tube 14 may be sufficient restriction to provide the necessary build up of pressure. The restriction maintains a pressure in the pressure tank 13 sufficient to provide texturization of protein in the apparatus.

The protein material may be added to the texturizing apparatus 10 such as through the hopper 31. If desired, suitable provision may be made for metering or controlling the amount of feed material passing through hopper 31. The feed material leaving hopper 31 falls through opening 20 in the housing 16 of valve 12 thus being deposited, for example, in pocket 41 as shown in FIG. IV. The valve member 18 may rotate in a clockwise direction such that pocket 41 aligns with pipe 28 and pocket 43 aligns with pipe 26 in FIG. V. At that point, the residual pressure in tank 13 and the pressure from pipe 26 act on the protein material. The pressure exerted on the protein material is sufficient to provide texturization. Good texturization has been obtained at 30 p.s.i.g. and apparently some texturization has been obtained even at 15 p.s.i.g. The pressure will generally be at least 55 p.s.i.g., preferably 80 to 110 p.s.i.g. The pressure exerted through pipe 26 by the fluid source 11 should be enough greater than the pressure exerted by the tank 13 that the protein material is rapidly forced through pipe 28, tube or chamber 14 and nozzle 59. The fluid provided by source 11 may be a fluid with a high heat transfer coefficient such as steam or a mixture of such a fluid with other gaseous fluid, for example a mixture of steam and air. It is postulated that the texturization take place immediately upon application of the pressure to the protein material by force from both the steam pipe 26 and the surge tank 13. In any event the protein material is texturized by the time it leaves the nozzle 59. Steam pressure continues to pass through valve 12 and pipe 28 for an instant following expulsion of the protein material from pipe 28. This raises the pressure of tank 13. Of course, some pressure is lost through the tube 14 and nozzle 59 for an instant following expulsion of the piece of protein from nozzle 59. However, the proper pressure may be maintained in tank 13 because of the controlled orifice size in nozzle 59. It has been found that the protein material fails to texturize appreciably if the back pressure from the pressure tank 13 is reduced to below 15 p.s.i.g. The valve member 18 continues to rotate, pocket 43 aligns with exhaust pipe 27 and residual pressure in pockets 41, 43 and passageway 46 is relieved. Pocket 43 then reaches the feed port and is loaded with material to be texturized. The operational process then continues as described with respect to texturization using the pocket 41. Texturization takes place using pockets 42 and 44 substantially as described with respect to pockets 41 and 43. The valve member 18 may be rotated at any desired speed depending upon such things as the size of the pockets, the number of pockets and the feed rate of protein material.

The following examples are for purposes of illustrating the present invention and are not intended to be limiting.

EXAMPLE I

A protein flour material having 70% protein content was prepared by mixing 70 parts soybean concentrate (Textrol[1]) and 30 parts soybean isolate (Promine R[2]). The term "parts" and "percent" as used herein, unless otherwise indicated, will refer to parts or percentages by weight on an as is moisture basis, the moisture content normally being about 6%. The moisture content of the mixture was then raised to 27%. Twenty pounds of the moistened flour material was inoculated with ½ pound of Bakers® cake yeast. The mixture was allowed to ferment at room temperature for 48 hours. The mixture was then fed at the rate of about 4 pounds per minute to texturizing apparatus constructed substantially as shown in FIGS. I–VI. The pressure tank 13 was a pipe having a ten inch internal diameter and a length of 12 feet. The tube 14 was a 1½ inch pipe mounted concentrically within the pressure tank 13. The nozzle had an orifice of ⅞ inch diameter. The plug 18 rotated at a rate of 32 revolutions per minute. The temperature of the steam fed to the valve 12 was 445° F. and the pressure in tank 13 was 60 p.s.i.g. The material leaving the nozzle was well textured and was found to have a surprisingly bland flavor. The flavor of the textured material did not have the usual sweet note of textured soy protein.

EXAMPLE II

Example I was repeated except using 2 pounds of cake yeast. Similar results were obtained except that a slight yeast taste was observed.

EXAMPLE III

A soy flour having a protein content of 55% was treated according to the present invention The soy flour had a moisture content of about 4.0%. One half-pound of cake yeast (*Saccharomyces cerevisae*) was mixed with 20 pounds of the soy flour. The moisture content of the mixture was raised to 27%. The soy flour was divided into three portions. Portion A was permitted to ferment at room temperature for 24 hours. Portion B was permitted to ferment at room temperature for 48 hours. Portion C was permitted to ferment at room temperature for 96 hours. Portions A, B and C were steam treated under the conditions described in Example I. A control, identical to Portions A, B and C except it was not fermented, was steam treated identical to Portions A, B and C. Portion A was compared with the control and found to be more bland. Portion A did have some residual sugar taste. Portion B was found to be more bland than Portion A. Portion C was found to taste identical to Portion B.

EXAMPLE IV

Example I was repeated except that the moisture content was adjusted to 25%. The total sugar level was found to be reduced 50% as compared to an unfermented sample. A bland product was obtained. The shear press value was found to be 1210 and the water holding capacity was found to be 1.5. The term "water holding capacity" as used herein refers to the total amount of water the protein material is able to hold and is determined by soaking the texturized protein in an excess of water for 20 minutes and then draining for five minutes. The water holding capacity is equal to the wet weight minus the dry weight and that value divided by the dry weight. Texture of the protein material may be measured in shear press values. Shear press values for texturized protein of the present invention will generally be in the range of 300 to 1500 pounds as determined by the following procedure. Sample is prepared for measurement by weighing out 75 grams (by weight basis) of texutrized protein material. The sample is placed in an excess of cold water and soaked at about 40° F. for 1.5 hours. The sample is drained for five minutes and divided into 3 equal parts by weight. The three parts are wrapped in plastic and allowed to stand at room temperature for 20 minutes. Each of the parts are tested in the Allo-Kramer Shear Press (Serial No. 1042, Model No.–5–2H) according to conventional techniques using a 2500 pound ten blade ring and the three values are added together.

EXAMPLE V

Example IV was repeated except that the moisture content was adjusted to 35%. The shear press value was 1050 and the water holding capacity was 1.9. A bland product was obtained.

EXAMPLE VI

Soy flour (Textrol) was treated according to the present invention. Sample A was a control and was not fermented. Samples B through G were prepared by mixing the yeast and/or enzyme with water and adding the water to the soy flour in an amount sufficient to raise the moisture content to 25 percent. Each sample was held at 100° F. for 96 hours. Samples C, E and G were treated with ammonium carbonate just prior to steam treatment. The ammonium carbonate was found to increase the water holding capacity and reduce the shear press values.

TABLE

| Sample | Fermentation process [1] | $(NH_4)_2CO_3$ | Water holding capacity | Shear press valus | pH |
|---|---|---|---|---|---|
| A | Control | No | 2.1 | 850 | 6.22 |
| B | Yeast | No | 2.0 | 940 | 6.06 |
| C | do | Yes | 2.2 | 840 | 6.34 |
| D | Enzyme | No | 1.7 | 1,040 | 5.84 |
| E | do | Yes | 1.8 | 1,110 | 6.00 |
| F | Yeast and enzyme | No | 1.6 | 1,420 | 5.8 |
| G | do | Yes | 1.8 | 1,140 | 6.07 |

[1] The yeast was Red Star Yeast® and was used at a level of 1.5% by weight. The enzyme was Diastase 80® and was used at a level of 1.0% by weight.

The embodiments of the invention in which an exclusive property or privilege is claimed are defined as follows:

1. A method for producing a bland textured protein product comprising fermenting texturizable particulate vegetable protein material to break down carbohydrates, said material having a moisture content of 20% to 35% by weight, said fermentation being sufficient to modify the flavor and to provide improved blandness of said vegetable protein material, and then feeding, said fermented particulate vegetable protein material to a processing zone, feeding a heated pressurized gaseous processing fluid including steam into said zone, the temperature of said fluid being at least 250° F. and thereby raising temperature in said zone to at least 250° F. and the pressure in said zone to at least 15 p.s.i.g. and applying a greater fluid pressure to said protein material from at least one direction to remove said protein material from said ozne thereby texturizing the fermented material.

2. The method of claim 1 wherein said fermentation step includes adding at least 0.5% yeast, by weight, to said vegetable protein material.

3. The method of claim 2 wherein the yeast is present in an amount of from 0.5% to 2.5%.

4. The method of claim 2 wherein the fermentation step includes treating the material with an enzyme.

5. The method of claim 4 wherein the enzyme is added in an amount of from 0.3% to 1.5% by weight.

6. The method of claim 5 wherein the enzyme is added in an amount of about 1.0% by weight.

7. The method of claim 1 wherein the fermentation step includes treating the material with an enzyme.

---

[1] Textrol® is a processed soy protein material having a minimum protein content of 63.5% (moisture free basis) and produced by Central Soya Co. Inc.
[2] Promine R® is an isolated soy protein material having a protein content of about 95% (moisture free basis) and produced by Central Soya Co. Inc.

8. The method of claim 1 wherein the total sugar level of said vegetable protein material is reduced about 50% during fermentation.

References Cited
UNITED STATES PATENTS

| | | | |
|---|---|---|---|
| 3,142,571 | 7/1964 | McAnelly | 99—17 XR |
| 3,231,387 | 1/1966 | Tsuchiya et al. | 99—238 R |
| 3,272,110 | 9/1966 | Tsuchiya | 99—238 R |
| 3,288,053 | 11/1966 | Perttula | 99—238 R |
| 3,364,034 | 1/1968 | Hoersch et al. | 99—98 |
| 3,585,047 | 6/1971 | Fujimaki et al. | 99—98 |
| 3,730,729 | 5/1973 | Strommer | 99—14 |

A. LOUIS MONACELL, Primary Examiner

J. R. HOFFMAN, Assistant Examiner

U.S. Cl. X.R.

426—46, 802